No. 694,909. Patented Mar. 4, 1902.
J. B. CHRISTOPHER.
ROLLER BEARING FOR CARS.
(Application filed Dec. 19, 1901.)
(No Model.)
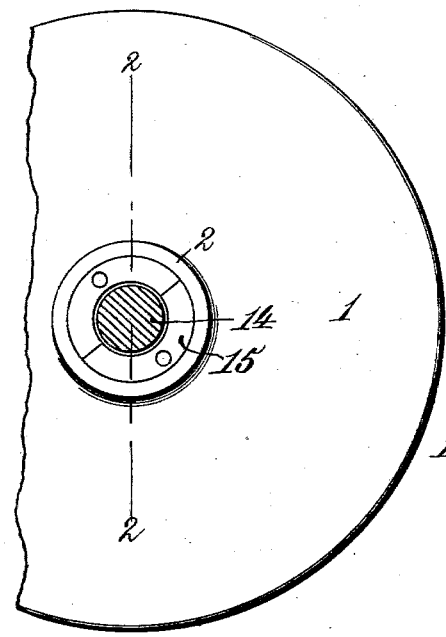
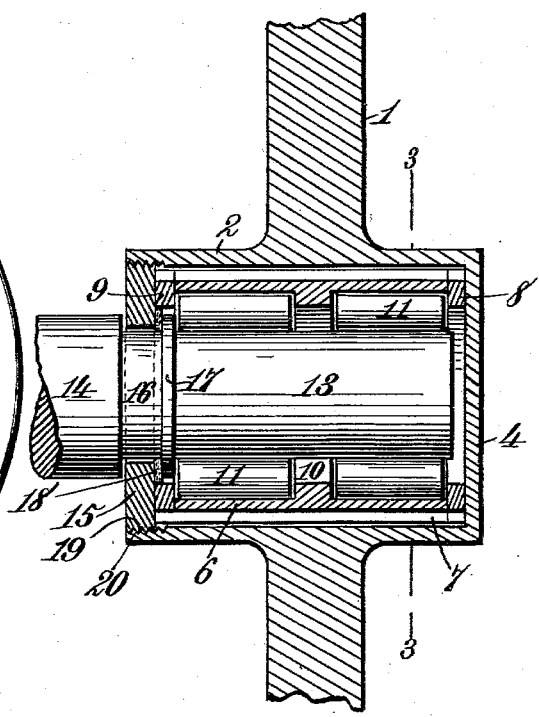
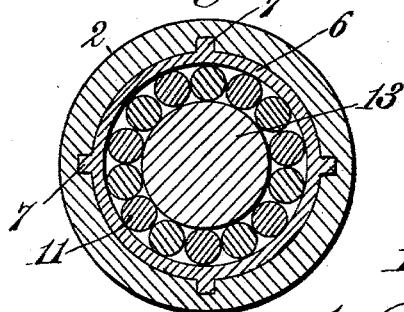
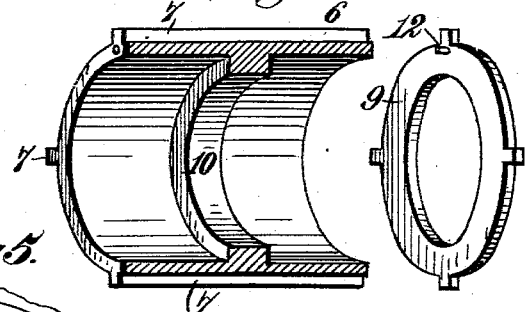
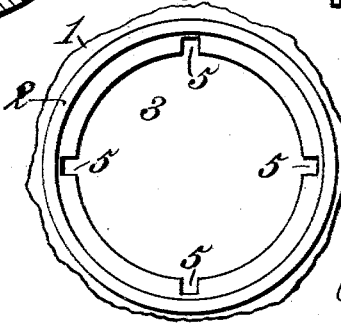
Witnesses.
Inventor.
James B. Christopher.
By James L. Norris.
Att'y.

UNITED STATES PATENT OFFICE.

JAMES B. CHRISTOPHER, OF MARQUETTE, ILLINOIS, ASSIGNOR OF ONE-HALF TO EDWARD ANDERSON, OF MARQUETTE, ILLINOIS.

ROLLER-BEARING FOR CARS.

SPECIFICATION forming part of Letters Patent No. 694,909, dated March 4, 1902.

Application filed December 19, 1901. Serial No. 86,556. (No model.)

*To all whom it may concern:*

Be it known that I, JAMES B. CHRISTOPHER, a citizen of the United States, residing at Marquette, in the county of Bureau and State of Illinois, have invented new and useful Improvements in Roller-Bearings for Cars, of which the following is a specification.

My invention relates to roller-bearings for cars, the same being particularly designed for use on pit-cars employed in coal-mines, although it is capable of use on any kind of car.

The object of the invention is to provide a novel construction of bearing of this kind which is perfectly dust-proof and in which the bushing may be readily removed for the purpose of planing or renewal.

A further object of the invention is to provide a novel means of mounting in a bearing of this kind a plurality of series of rollers, by means of which a car provided with my improvements is adapted to take any kind of curve.

Other objects and advantages of the invention will hereinafter appear, and the novel features thereof will be set forth in the claims.

In the drawings forming part of this specification, Figure 1 is a side elevation of a car-wheel on which my improvements are employed. Fig. 2 is a section on the line 2 2 of Fig. 1. Fig. 3 is a cross-section on the line 3 3 of Fig. 2. Fig. 4 is a sectional perspective view of two of the parts of the bushing, and Fig. 5 is an end elevation of the hub of the wheel.

Like reference-numerals indicate like parts in the different views.

In carrying out my invention the wheel 1 has the hub 2 thereof provided with a central cylindrical bore or opening 3, which extends from the inner side of said hub and terminates a short distance from the outer side thereof. This forms at one end of the hub a narrow web 4, which serves to close the passage into the opening 3 from the outside. The hub 2 is formed on its interior with a plurality of longitudinally-extending grooves 5, which constitute keyways, as will hereinafter appear, the said keyways extending from the open end of the casing formed by the hub 2 to a point adjacent to the web 4. Fitting within the hub 2 is a bushing 6, the same being cylindrical in form and provided along its outer surface with longitudinally-extending ribs or projections 7, corresponding in number with the keyways 5 in the hub 2 and adapted to fit within said keyways. When the bushing 6 is applied to the hub 2, the ribs or projections 7 thereon are introduced into the grooves or keyways 5, and said bushing is thereby locked or keyed to the hub 2, so that it will rotate with the latter. The bushing 6 is formed at its ends with inwardly-extending annular flanges 8 9 and at a point intermediate its ends with an inwardly-extending annular flange or lug 10. The flanges 8 9 10 constitute guides for the rollers 11 and form two separate raceways for said rollers. The rollers 11 are therefore arranged in two separate independent series, for a purpose which will hereinafter appear, and are preferably comparatively short.

The bushing 6 is made in three parts, the central cylindrical part having the annular lug 10 formed integral with it. The flanges 8 and 9 at the ends of the bushing are formed by rings or washers which are separate from the central part, but conform to the outer cross-sectional contour of said cylindrical part and are adapted to fit closely against the ends of the same. The inner bores or openings in said washers, however, are of smaller diameter than that of said central cylindrical part. To properly guide said washers on said cylindrical part, so as to cause the outer ribs thereon to register or lie in line with the ribs on said central part before all the parts of the device have been assembled, I form on the inner surface of each of said washers a dowel-pin 12, which is adapted to fit within a corresponding socket or opening in the end of said central cylindrical part.

The journal or spindle 13 of the shaft or axle 14, on which the wheel 1 is mounted to turn, fits within the hub 2 and is adapted to bear upon the two series of rollers 11. The said journal is cylindrical in form to correspond with the cylindrical bushing 6 and with the rollers 11, which are located between it and said bushing; but at its inner end it is provided with a loose collar 15, which fits within the annular groove 16. The groove 16 forms on said axle a fixed collar or shoulder 17, the said collar or shoulder 17 being of course integral with said axle. The inner wall of the collar 17 lies in the same plane with the inner wall of the flange 9 on the bushing 6, and the outer wall of said collar 17 lies in the same plane with the outer wall of the flange 9. Between the collars 15 and 17 is located a washer 18, provided for the purpose of preventing the entrance of dust to the interior of the casing formed by the hub 2. The collar 15 is made in two parts, as clearly shown, and is provided with external screw-threads 19 for the purpose of connecting said collar rigidly with the end of the hub 2. The said hub is provided with internal screw-threads 20 for receiving the threads 19. As the collar is thus secured to hub 2, it is moved with said hub and serves to prevent by its engagement with the collar 17 the disconnection of the hub 2 from the journal 13.

From the foregoing description it will be observed that a perfectly dust-proof casing is provided for the roller-bearing, the same being completely closed at one end by the web 4, which is integral with the body of the hub 2, and at the other end by a felt washer or gasket 18, which is disposed between the collars 15 and 17. The hub is also effectively prevented from disconnection from the journal 19, on which the wheel is mounted, and the rollers 11, located between said journal 12 and the bushing 6, constitute an effective antifriction-bearing on which the wheel may turn. As the rollers are comparatively short and as they are arranged in two separate independent series, it will be noted that in passing around a curve in one direction the weight of the vehicle will be sustained by the outer series of rollers on two of the wheels and the inner series of rollers on the other two wheels and that when passing around a curve in the opposite direction the weight of the vehicle will be sustained by the series of rollers which were inactive in the first instance. When traveling along a straight track, both series of rollers in each of the wheels will be operative. The flanges 8, 9, and 10 serve as guides for the rollers 11, which are located between the same and prevent any jamming or lagging of any of the rollers.

The bushing 6 will of course be made of highly-tempered material; but in the event of wear of the same it may be readily withdrawn from the hub 2, in which it is seated, for the purpose of renewal or to be planed down, so as to make a close fit. This is an extremely important feature of construction, as it adds to the life of the bearing by enabling the same to be practically renewed by the planing or renewal of a single part.

In assembling the parts of the device the ring or washer 9 is first placed upon the spindle 13 and moved rearwardly upon the body of the axle 14. The cylindrical part of the bushing 6 is then applied, and while the ring or washer 9 is still back upon the axle 14 the inner series of rollers 11 are introduced between the spindle 13 and the bushing 6. The washer 9 is then moved outwardly until it comes in contact with the inner end of the central part of the bushing, and the dowel-pin 12 on said washer is inserted into the corresponding socket therefor in said central part. This properly alines the ribs 7 on said washer with those on the central part of the bushing. The outer series of rollers 11 are now introduced into their proper positions and the outer washer 8 applied, with its dowel-pin 12 fitting within the socket therefor in the central part of the bushing. The hub 2 is now placed upon the bushing 6, with the ribs 7 of the latter fitting within the grooves or keyways 5 of the former. The loose washer 15 is then grasped with a wrench or spanner, so as to prevent its turning, and the wheel 1 is rotated, so as to screw up the hub 2 thereof onto the collar 15. The said collar 15 is forced into close contact with the ring or collar 9 and prevents the longitudinal separation of the different parts of the bushing 6 from one another.

My invention has been described in its preferred form; but I realize that many minor changes may be made therein. I do not, therefore, limit myself to the details of construction herein shown and described except as defined by the appended claims.

Having now described my invention, what I claim as new, and desire to secure by Letters Patent, is—

1. In a roller-bearing for cars, the combination with a shaft or axle and a wheel mounted thereon, the said wheel having the opening in the hub thereof closed at one end and provided with longitudinally-extending grooves or keyways, of a removable bushing located within said hub, provided with longitudinally-extending ribs which fit within said grooves, and with inwardly-extending flanges at its ends and at a point intermediate its ends, a plurality of series of rollers located between said shaft or axle and said bushing and fitting within the spaces between said flanges, and a collar fitting loosely within an annular groove on said shaft or axle and secured to said hub at its open end.

2. In a roller-bearing for cars, the combination with a shaft or axle and a wheel mounted thereon, the outer end of the opening in the hub of said wheel being closed by an integral web, and said hub being provided on its interior with longitudinally-extending grooves, of a bushing located within said opening and provided with longitudinally-extending ribs, which fit within said grooves, and with inwardly-extending annular flanges at its ends and at a point intermediate its ends, a plurality of series of annularly-arranged rollers located between said shaft or axle and said bushing and fitting within the spaces between said flanges, an outwardly-extended fixed collar on said shaft or axle lying in the same plane with the flange at the inner end of said bushing and forming on said shaft or axle an annular groove, a loose collar fitting within the said annular groove and secured around its outer edge to the open end of said hub, and a packing ring or washer located between said loose and fixed collars for preventing the entrance of dust to the bearings.

3. In a roller-bearing for cars, the combination with a shaft or axle having an annular groove therein, and a wheel mounted thereon, the said wheel having the opening in the hub thereof closed at one end, provided with longitudinally-extending grooves or keyways and with screw-threads at its open end, of a removable bushing located within said hub provided with longitudinally-extending ribs which fit within said grooves or keyways and with inwardly-extending flanges at its ends and at a point intermediate its ends, a plurality of series of rollers located between said shaft or axle and said bushing and fitting within the space between said flanges, and a two-part collar fitting loosely within said annular groove and provided with external screw-threads adapted to engage the screw-threads in the end of said hub.

4. In a roller-bearing for cars, the combination with a shaft or axle having an annular groove therein, and a wheel mounted thereon, the said wheel having the opening in the hub thereof closed at one end and provided with longitudinally-extending grooves or keyways, of a removable bushing located within said hub, provided with longitudinally-extending ribs which fit within said grooves or keyways, and made in three parts having the same exterior contour, the central part being provided with an inwardly-extending annular flange at a point intermediate its ends, and the other parts being in the form of rings or washers which fit against and have a dowel-pin connection with the ends of said central part and form at the ends of said bushing inwardly-extending flanges, a plurality of series of rollers located between said shaft or axle and said bushing and fitting within the spaces between said flanges, and a collar fitting loosely within said annular groove and secured to said hub at its open end.

In testimony whereof I have hereunto set my hand in presence of two subscribing witnesses.

JAMES B. CHRISTOPHER.

Witnesses:
E. ANDERSON,
ELIZABETH ROBERTS.